United States Patent Office 3,829,529
Patented Aug. 13, 1974

3,829,529
ROOM-TEMPERATURE CURING ORGANO-
POLYSILOXANES
Guenther Fritz Lengnick, Manitou Beach, Mich., assignor to Stauffer Chemical Company, Westport, Conn.
No Drawing. Continuation-in-part of abandoned application Ser. No. 214,430, Dec. 30, 1971. This application May 29, 1973, Ser. No. 364,457
Int. Cl. C08f 35/02
U.S. Cl. 260—827
9 Claims

ABSTRACT OF THE DISCLOSURE

The invention relates to silane cross-linking agents having different hydrolyzable groups on the silane molecule and to curable one-component modified organopolysiloxane compositions obtained from the reaction of these cross-linking agents with hydroxyl-terminated organopolysiloxanes.

This application is a continuation-in-part of applicant's copending application Ser. No. 214,430, filed Dec. 30, 1971 and now abandoned.

This invention relates to curable organopolysiloxanes, particularly modified organopolysiloxanes which are activated in the presence of moisture and more particularly to curable one-component modified organopolysiloxanes which are obtained from the reaction of hydroxyl-terminated organopolysiloxanes and silane cross-linking agents containing different hydrolyzable functional groups on the silane molecule.

Heretofore certain types of organopolysiloxane compositions were converted to an elastomeric state by combining two or more stable components in the presence of a catalyst. Generally, the end-user was provided with a two-package system, i.e., a system containing two or more stable components which, when mixed together, rapidly cured to a solid unworkable state. Although the two-package system was found to be adequate for some applications, it was found to be undesirable in many other applications due to the lack of skilled workmen or because of inadequate equipment to carry out the necessary mixing operations. Consequently, there was a definite need for one-package, room-temperature curable systems containing two or more terminal functional groups. While these systems have met with some success, they have been extremely difficult to adapt to conditions where variable curing times are desirable or necessary. For example, in some applications, curing times varying from a few minutes up to several hours and even days are necessary. However, the organopolysiloxane systems known heretofore do not possess cure time control, a property which is desirable and often necessary in many industrial applications.

Modified organopolysiloxanes which contain different hydrolyzable groups on the terminal silicon atoms are disclosed in U.S. Pat. 3,560,244 to Charles G. Neuroth. Although the terminal hydrolyzable groups disclosed therein suggest the possibility of having alkoxy groups in combination with other hydrolyzable groups, it does not describe a modified organopolysiloxane having terminal groups which consist of hydrocarbon groups and different hydrolyzable groups on the same terminal silicon atom. The applicant has found that the combination of different hydrolyzable groups with hydrocarbon groups provides variable working times without reducing the cross-linking ability of the polymers, provides controllable curing times and provides a means for controlling the properties of the cured elastomers.

It is therefore an object of this invention to provide room-temperature-curable organopolysiloxane compositions. Another object of this invention is to provide compositions which have variable working times without reducing the cross-linking ability of the polymers employed. Still another object of this invention is to provide organopolysiloxane compositions with controllable curing times. A further object of this invention is to provide curable organopolysiloxane compositions having improved physical properties. A still further object of this invention is to provide novel cross-linking agents which will react with hydroxyl-terminated organopolysiloxanes to form products capable of curing to elastomeric materials. A still further object of this invention is to provide curable organopolysiloxane compositions which may be dispensed in a single package.

The foregoing objects and others which will become apparent from the following description are accomplished in accordance with this invention, generally speaking by providing curable compositions comprising organopolysiloxanes of the general formula:

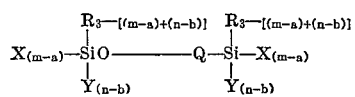

wherein the R(s) which may be the same or different represent monovalent hydrocarbon radicals, halogenated monovalent hydrocarbon radicals or cyanoalkyl radicals; Q represents a siloxane radical of the formula:

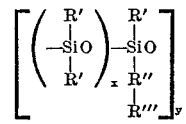

in which the R'(s) which may be the same or different represent monovalent hydrocarbon radicals, halogenated monovalent hydrocarbon radicals or cyanoalkyl radicals; R'' is a divalent hydrocarbon radical; R''' is a polymeric organic group derived from recurring olefinic units and linked to R'' by a carbon-to-carbon linkage; X and Y are different functional groups which are hydrolyzable in ambient moisture; $a$ and $b$ are numbers, each equal to or less than 1 and whose sum is equal to 1; $m$ and $n$ are each greater than 0 and less than 3 and the sum of $m$ and $n$ is greater than 1; $x$ is a number of from 0 to 20,000 and $y$ is a number of from 1 to 500.

The radicals represented by R and R' above are organic radicals selected from the class consisting of alkyl radicals having from 1 to 18 carbon atoms such as methyl, ethyl, propyl, butyl, hexyl, octyl, decyl, dodecyl, tetradecyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; halo-aryl radicals such as chlorophenyl, tetrachlorophenyl, difluorophenyl and the like; alkenyl radicals such as vinyl, allyl and the like. The group represented by R'' is a divalent radical having from 1 to 8 carbon atoms such as methylene, ethylene, propylene, butylene, hexylene and octylene; R''' is a polymer or copolymer linked to an organopolysiloxane "backbone" through a carbon-to-carbon linkage with a divalent hydrocarbon radical represented by R'' above; X and Y represents groups which are hydrolyzable or condensible in ambient moisture such as halogen, acyloxy, —OOCR'''' hydrocarbonoxy, —OR''''

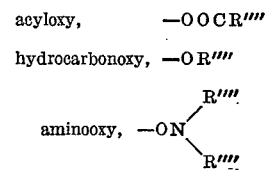

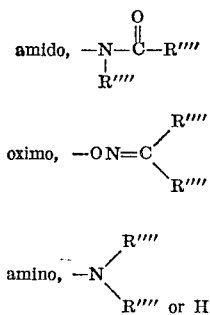

radicals, R''''(s) which may be the same or different represent monovalent hydrocarbon radicals and halogenated monovalent hydrocarbon radicals. Examples of acyloxy groups are the monoacyl radicals of carboxylic acids such as formyloxy, acetoxy, propionyloxy, valeryloxy, caproyloxy, myristoyloxy and stearoyloxy radicals. Other hydrolyzable groups are hydrocarbonoxy groups having from 1 to 18 carbon atoms such as methoxy, butoxy, heptoxy, octoxy, decoxy, phenoxy and the like; aminooxy groups such as dimethylaminooxy, diethylaminooxy, dipropylaminooxy, dibutylaminooxy, dioctylaminooxy, diphenylaminooxy, ethylmethylaminooxy, methylphenylaminooxy and the like. Suitable oximo groups are acetophenone oximo, acetoximo, benzophenone oximo, 2-butanone oximo, diisopropylketoximo, chlorocyclohexanone oximo, *alpha*-bromoacetophenone oximo and the like. Examples of suitable amino groups are ethylamino, dimethylamino, diethylamino, dipropylamino, dibutylamino, dihexylamino, anilino, anisidino, benzidino, cumidino, phenetidino, toluidino and the like. Other hydrolyzable groups are amido radicals such as formamido, acetamido, propionamido, heptanamido, benzamido and the like.

The curable compositions of this invention are prepared by reacting silanes of the formula:

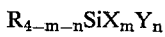

with an organopolysiloxane of the formula:

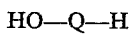

in which R, Q, X, Y, m and n are the same as those represented above, at any convenient temperature, preferably from about room-temperature up to about 150° C. It should be understood, of course, that higher or lower temperatures may be employed if desired, although preferably the reaction should be carried out at temperatures below about 200° C. If desired, the reaction may be carried out in the presence of an inert solvent, i.e., a solvent which is non-reactive with the organopolysiloxanes or the silanes. Solvents which may be used include hydrocarbons such as benzene, toluene, xylene; halogenated hydrocarbons such as methylene chloride, perchloroethylene, chlorobenzene and the like; organic ethers such as diethyl ether and dibutyl ether or hydroxyl-free fluid siloxanes. A solvent may be beneficial when viscous organopolysiloxanes are used.

Although the amount of silane cross-linking agent is not critical, a sufficient number of the hydrolyzable groups should be present to react with the terminal hydroxyl groups on the organopolysiloxane. Generally from about 1.0 to about 5 moles of the silane may be used per mole of silicon-bonded hydroxyl group on the organopolysiloxane. It is preferred that the reaction be carried out in the absence of moisture since the latter may interfere with the reaction. However, traces of moisture are not especially harmful if an excess of the silane cross-linking agent is present.

The silane cross-linking agents of this invention may be prepared by reacting organoacyloxysilanes with organoaminooxysilanes in the desired mole ratio to provide an organosilane containing a mixture of acyloxy and aminooxy groups linked to the silicon atom. Likewise, oximo or amido groups may be substituted for either the acyloxy and/or aminooxy groups to provide silanes having a multiplicity of hydrolyzable groups on the silicon atom.

As an alternative procedure, an organodiacyloxychlorosilane may be reacted with either a diorganohydroxylamine or an organic oxime in the presence of an acid acceptor to provide an organosilane having a mixture of hydrolyzable groups linked to the silicon atom. Examples of suitable acid acceptors are pyridine and trialkylamines such as trimethylamine, triethylamine, tripropylamine and the like.

Generally, these organic silanes containing a hydrolyzable group are reacted with another organic silane having a different hydrolyzable group at a temperature of from about room-temperature to about 150° C., preferably from about 40° C. to 120° C. in the presence of a solvent which is inert to the reactants and reaction product. Suitable solvents include aliphatic hydrocarbons such as pentane, hexane, heptane, octane; aromatic hydrocarbons such as benzene, toluene, xylene, naphthalene as well as halogenated solvents such as methylene chloride, chlorobenzene and the like. Other solvents which may be used are organic ethers such as diethyl ether, dibutyl ether and hydroxyl-free fluid siloxanes.

The conventional organopolysiloxanes used in the preparation of the grafted organopolysiloxanes may be prepared from difunctional organosilanes of the formula:

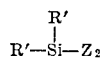

wherein the R'(s) which may be the same or different represent monovalent aliphatic, alicyclic or aromatic hydrocarbon radicals such as methyl, ethyl, vinyl, allyl, cyclohexyl, cyclohexenyl, phenyl and tolyl and halogenated derivatives thereof and Z represents hydrolyzable atoms or groups such as halogen atoms or alkoxy groups. The diorganopolysiloxanes may be homopolymers as well as copolymers, that is, compounds derived from two or more different diorganosilanes and even the organic radicals linked to any particular silicon atom may be different organic radicals.

The grafted organopolysiloxanes contemplated herein have one or more polymeric organic side chains linked to the organopolysiloxane backbone. These grafted polymers are prepared by hydrogen abstraction in the presence of free-radical initiators to form an active site on the organopolysiloxane molecule for grafting the organic polymer thereto.

Any organopolysiloxane capable of forming free radicals or active sites may be used in the grafting step. Thus, the polysiloxane polymer should be one which is substantially free of any aliphatic unsaturation; however, a low degree of any such unsaturation does not preclude the desired reaction, even though it may set up a competitive reaction which is preferably avoided.

Examples of suitable organopolysiloxane polymers and copolymers which may be used in the formation of graft polymers are hydroxyl-terminated siloxane fluids such as methyl or methylphenyl silicone fluids; copolymers of di-methylsiloxane and methylphenyl or diphenylsiloxane units.

Examples of polymerizable organic monomers having aliphatic unsaturation which may be used in the graft polymerization are low molecular weight, straight and branched chained hydrocarbons such as ethylene, propylene, butylene; vinyl halides such as vinyl chloride and vinyl fluoride; vinyl esters of organic acids such as vinyl acetate, styrene, ring-substituted styrenes and other vinyl aromatics such as vinyl pyridine and vinyl naphthalene; acrylic acid and derivatives of acrylic acid including the salts, esters, amides and acrylonitrile; N-vinyl compounds such as N-vinylcarbazole, N-vinylpyrrolidone and N-vinylcaprolactam and vinyl silicon compounds such as vinyltriethoxysilane.

Di-substituted ethylenes of the type $CH_2=CW_2$ may be used, including vinylidene fluoride, vinylidene chloride, vinylidene cyanide, methacrylic acid and compounds derived therefrom such as the salts, esters and amides, as methacrolein, methacrylonitrile and the like.

Examples of di-substituted ethylenes of the type CHW—CHW, such as vinylene carbonate and various monomers which polymerize best in the presence of other monomers, e.g., maleic anhydride, esters of maleic and fumaric acids, stilbene, indene and coumarone may be used in the formation of these graft polymers.

In preparing the grafted organopolysiloxanes of this invention, the grafting step is most expeditiously effected in the presence of a free-radical initiator, normally organic peroxides; although other free-radical initiators such as azo compounds, in which both nitrogen atoms of the azo linkage are attached to a tertiary carbon atom and the remaining valences of the tertiary carbon atom are satisfied by nitrile, carboxy, cycloalkylene or alkyl radicals, preferably having from 1 to 18 carbon atoms, can also be used. In addition to the above-mentioned initiators, ionized radiation may also be used to bring about the formation of free radicals.

The most suitable peroxide initiators are hydroperoxides, such as t-butyl hydroperoxide, cumene hydroperoxide and decylene hydroperoxide; dialkyl peroxides such as t-butyl and dicumyl peroxide and 2,5-dimethyl-2,5,-di-t-butylperoxyhexane; cyclic peroxides such as ascaridole; peresters such as t-butyl perbenzoate, t-butyl peroxy isopropyl carbonate and t-butyl peroctoate; keto peroxides such as acetone peroxide and cyclohexanone peroxide and diacyl peroxides such as benzoyl peroxide may also be used.

The amount of free-radical initiator used is not critical; thus, any amount capable of producing a preceptible degree of grafting is suitable. Generally as little as 0.05 percent of the more active peroxide initiators based on the weight of the monomer is adequate in most cases. Where it is desirable to increase the reaction rate, then as much as 3 percent or even more of the initiator may be used.

Although the temperature and pressure is not critical, it is preferred that the grafting operation be conducted at temperatures and pressures sufficient to maintain the organic monomers in a liquid phase. Generally temperatures below about 150° C. and more preferably between about 50° C. and 150° C. are sufficient for the graft polymerization. Examples of suitable solvents which may be used are hexane, heptane, benzene, toluene, xylene, naphthalene and the like.

While it is possible to graft polymerize organopolysiloxanes free of terminal-hydroxyl groups or hydrolyzable groups and to subsequently treat the grafted polymer to incorporate such groups, it is preferred that the organopolysiloxanes contain terminal-hydroxyl groups. The hydroxyl-terminated graft polymer is appropriately treated to substitute groups which are hydrolyzable by ambient moisture for the hydroxyl groups.

Fillers may also be included in these curable compositions to improve the physical properties. Examples of suitable fillers are various kinds of silicas, oxides of iron, zinc, cadmium, titanium, aluminum, carbonates and the like. The proportion and type of filler employed will depend to a certain extent on the use to which the composition is to be applied.

In addition to the fillers mentioned heretofore, compositions conforming to the invention may contain coloring agents, thixotropic agents, ultraviolet light stabilizers and antioxidants.

In addition to the constituents mentioned above, the compositions may contain for the purpose of accelerating the curing rate certain metallic salts of organic carboxylic acids. Examples of suitable catalysts are iron stearate, lead octoate, tin butyrate, tin naphthenate, dibutyltin dilaurate, dibutyltin diacetate, bis-(dibutyltin oleate) oxide, bis-(dibutyltin stearate) oxide, dibutyltin oleate hydroxide and the like. The catalyst may be used in an amount of from about 0.001 to about 1 percent, preferably from about 0.2 to about 0.5 percent based on the weight of the organopolysiloxane.

Depending upon the type of hydrolyzable groups present on the silane cross-linking agent, these compositions will cure to an elastomeric state in a matter of minutes up to several hours or days when exposed to atmospheric moisture.

The products of this invention adhere to a variety of materials such as, for example, wood, metal, glass ceramics, plastics and the like. In the case of metals, it may be desirable to pretreat the metal before applying the compositions of this invention. These compositions are useful for sealants, gasket materials, shock absorbers and for coating glass, metals, fabrics and the like.

Various aspects of the invention are further illustrated in the following examples which are not to be taken as in any way limiting the scope thereof. In the examples, all parts are by weight unless otherwise specified.

EXAMPLE 1

To a reactor containing about 13.0 parts of methyltriacetoximosilane and 78 parts of chloroform are added 22.0 parts of methyltriacetoxysilane and heated to reflux temperature for about 24 hours with agitation. After removing the chloroform by vacuum distillation, a clear product is recovered which is identified as:

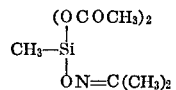

EXAMPLE 2

To a reactor containing about 35 parts of methyldichloro-N,N-diethylaminooxysilane, about 125 parts of benzene and about 27.5 parts of pyridine are added about 27.5 parts of acetoxime dissolved in 250 parts of benzene and heated to reflux temperature for about 2 hours. A precipitate which is identified as pyridinium hydrochloride is removed by filtration and the benzene and any excess pyridine are removed by vacuum stripping. A liquid product is recovered which is identified as:

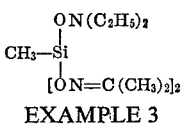

EXAMPLE 3

To a reactor containing about 31.8 parts of methyltris-(N,N-diethylaminooxy) silane are added 12.9 parts of methyltris(acetoximo) silane and heated to about 60° C. with agitation for about 2.5 hours. A yellow liquid product is obtained which is identified as:

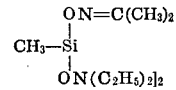

EXAMPLE 4

To a reactor containing about 16 parts of dimethoxydichlorosilane, about 100 parts of benzene and about 20 parts of pyridine are added about 14.6 parts of acetoxime dissolved in 125 parts of benzene and heated to reflux temperature for about 4 hours. A precipitate which is identified as pyridinium hydrochloride is removed by filtration and the benzene and any excess pyridine are removed by vacuum stripping. The resultant product is identified as:

$(CH_3O)_2—Si[ON=C(CH_3)_2]_2$

EXAMPLE 5

To a reactor containing 17.3 parts of dichloromethylacetoxysilane, about 100 parts of benzene and about 20 parts of pyridine are added 27.0 parts of acetophenoxime dissolved in about 125 parts of benzene and heated to reflux temperature for about 4 hours. A precipitate which is identified as pyridinium hydrochloride is removed by filtration and benzene and any excess pyridine are removed by vacuum stripping. The resultant product is identified as:

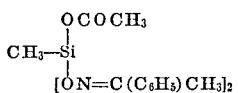

EXAMPLE 6

In accordance with the procedure described in Example 5, 14.6 parts of acetoxime dissolved in 150 parts of benzene are added to a reactor containing 17.3 parts of methyldichloroacetoxysilane, about 70 parts of benzene and 16.5 parts of pyridine and heated at about 81° C. for about 4 hours. A precipitate identified as pyridinium hydrochloride is removed by filtration and the remainder of the liquid product vacuum stripped at 80° C. for 1.5 hours at less than 1 mm. Hg. A liquid product is recovered which is identified as:

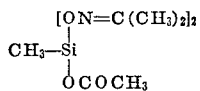

EXAMPLE 7

To a reactor containing about 8 parts of methyltris-(N,N-diethylaminooxy) silane are added about 11 parts of methyltriacetoxysilane under an atmosphere of nitrogen. The mixture is heated to reflux temperature and refluxed for about 4.5 hours. The resultant liquid product is identified as:

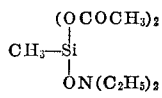

EXAMPLE 8

In accordance with the procedure described in Example 7, approximately 5.5 parts of methyltriacetoxysilane are added to about 16.0 parts of methyl-tris-(N,N-diethylaminooxy) silane. The resultant liquid product is identified as:

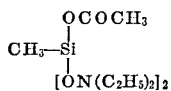

EXAMPLE 9

Approximately 8.9 parts of acetamide dissolved in about 30 parts of toluene are added to a reactor containing about 39 parts of methyltriacetoxysilane in about 150 parts of toluene and heated to reflux temperature for about 3 hours with agitation. The reaction mass is vacuum stripped for 1.5 hours at 80° C. at less than 1 mm. Hg. A transparent liquid is obtained which is identified as:

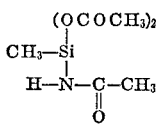

EXAMPLE 10

In accordance with the procedure described in Example 9, about 17.8 parts of acetamide in about 40 parts of benzene are added to a reactor containing about 33 parts of methyltriacetoxysilane in about 120 parts of benzene and heated to reflux temperature for about 3 hours. After vacuum stripping the reaction mass for 1.5 hours at 80° C. at less than 1 mm. Hg, a transparent liquid is obtained which is identified as:

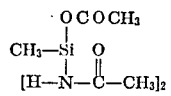

EXAMPLE 11

About 12.5 parts of benzamide dissolved in about 50 parts of toluene are added to a reactor containing about 39 parts of methyltriacetoxysilane in about 150 parts of toluene and heated to reflux temperature for about 3 hours with agitation. The reaction mass is vacuum stripped for 1.5 hours at 80° C. at less than 1 mm. Hg. The resultant product is identified by analysis as:

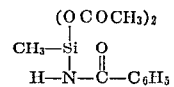

EXAMPLE 12

About 44 parts of diethylamine in 80 parts of heptane are added to a reactor containing 15.0 parts of methyltrichlorosilane and 70 parts of heptane and agitation and heated to reflux temperature for 2 hours. A precipitate which is identified as diethylamine hydrochloride is removed by filtration and the heptane and any excess diethylamine are removed by vacuum stripping. About 7.3 parts of acetoxime dissolved in 30 parts of heptane are added to the reactor and heated to reflux temperature for 2 hours. The heptane and other volatile products are removed by vacuum stripping. The resultant product is identified as:

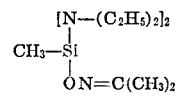

EXAMPLE 13

In accordance with the procedure described in Example 12 about 60 parts of aniline dissolved in 80 parts of heptane are added to a reactor containing 15.0 parts of methyltrichlorosilane and 70 parts of heptane and heated to reflux temperature for 2 hours. After removing the aniline hydrochloride by filtration and vacuum stripping the remainder of the reaction mass, about 7.3 parts of acetoxime dissolved in 30 parts of heptane are added to the reactor and heated to reflux temperature for 2 hours. The heptane and other volatile products are removed under vacuum. The resultant product is identified as:

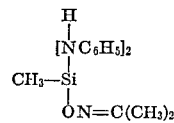

EXAMPLE 14

A solution containing about 17.4 parts of butyraldoxime and 50 parts of benzene is added dropwise to a reactor containing about 27.1 parts of dichlorohexylcaproyloxy-silane, about 100 parts of benzene and about 16.2 parts of pyridine and refluxed for 4 hours. A precipitate which is identified as pyridinium hydrochloride is removed by filtration and the remainder of the reaction mass is vacuum stripped at about 110° C. at less than 1 mm. Hg, for 2 hours. A liquid product is recovered which is identified as:

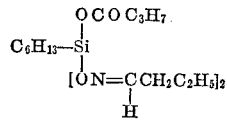

EXAMPLE 15

Modified organopolysiloxanes are prepared by grafting unsaturated organic compounds to polydimethylsiloxanes in the presence of a free-radical initiator at a temperature of from about 60° C. to 190° C. The unreacted unsaturated compounds are vacuum stripped at 1 mm. Hg or less at an elevated temperature. The essential data necessary for preparing these modified organopolysiloxanes are shown in Table I.

within the spirit and scope of the appended claims are to be included therein.

TABLE I

| Example number | Olefinic compound | | Hydroxylated fluid | | Free-radical initiator | | Reaction conditions | | Final polymer viscosity, cs. |
|---|---|---|---|---|---|---|---|---|---|
| | Type | Parts | Viscosity, cs. | Parts | Type | Parts | Temp., °C. | Time, hr. | |
| 15(a) | {Acrylonitrile / Butyl acrylate} | 14.6 / 35.4 | 1,900 | 50 | BP | 0.5 | 80 | 1.5 | 14,000 |
| 15(b) | {Acrylonitrile / Butyl acrylate} | 9.0 / 51.0 | 800 | 40 | BP | 0.5 | 80 | 1.7 | 7,800 |
| 15(c) | {Acrylonitrile / Ethyl acrylate / Butyl acrylate} | 9.1 / 2.9 / 48.0 | 800 | 40 | BP | 0.25 | 80 | 2.0 | 20,200 |
| 15(d) | Methyl acrylate | 50.0 | 400 | 50 | BP | 0.5 | 80 | 4.0 | 15,500 |
| 15(e) | Lauryl methacrylate | 70.0 | 400 | 30 | BP | 0.5 | 80 | 5.0 | 19,400 |
| 15(f) | {Styrene / Butyl acrylate} | 250.0 / 204.0 | 610 | 304 | BP | 2.0 | 125 | 24.0 | 14,500 |
| 15(g) | Vinyl chloride | 45.0 | 6,700 | 450 | BPer | 1.8 | 80 | 4.0 | 17,800 |

NOTE.—BP=tertiary butyl peroxide; BPer=tertiary butyl peroctoate; cs.=centistokes at 25° C.

EXAMPLE 16

Approximately 35 parts of a hydroxyl-terminated modified organopolysiloxane prepared in accordance with the procedure described in Example 15(a) is mixed with 3.3 parts of the silane cross-linking agent of Example 1 and heated under an atmosphere of nitrogen to about 80° C. for about 0.5 hour. The volatile materials are removed by vacuum stripping and the resulting product consists predominately of the following:

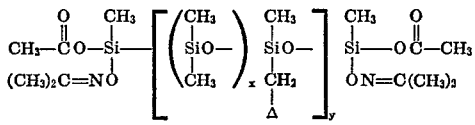

A=acrylonitrile-butylacrylate graft copolymer.

The product is molded and cured under ambient conditions. The composition is tack-free in about 0.2 hour.

EXAMPLE 17

The hydroxyl-terminated organopolysiloxanes prepared in accordance with the procedure described in Example 15 are reacted with the various cross-linking agents of Examples 2 to 14 in accordance with the procedure described in Example 16. The results of these examples are illustrated in Table II.

TABLE II

| Example number | Silane | | Modified siloxanes | | Tack-free time, hours |
|---|---|---|---|---|---|
| | Ex. No. | Parts | Ex. No. | Parts | |
| 17 | 2 | 3.2 | 15(b) | 34 | 1.4 |
| 18 | 3 | 3.5 | 15(c) | 37 | 1.2 |
| 19 | 4 | 3.7 | 15(d) | 38 | 1.3 |
| 20 | 5 | 3.1 | 15(e) | 31 | 1.2 |
| 21 | 6 | 3.3 | 15(f) | 33 | 0.4 |
| 22 | 7 | 3.4 | 15(g) | 36 | 0.6 |
| 23 | 8 | 3.1 | 15(a) | 32 | 0.2 |
| 24 | 9 | 3.5 | 15(c) | 37 | 0.3 |
| 25 | 10 | 3.3 | 15(d) | 35 | 2.4 |
| 26 | 11 | 3.1 | 15(b) | 33 | 0.1 |
| 27 | 12 | 3.1 | 15(c) | 33 | 1.0 |
| 28 | 13 | 3.2 | 15(b) | 34 | 1.1 |
| 29 | 14 | 3.3 | 15(a) | 35 | 24.0 |
| 30* | 14 | 3.3 | 15(a) | 33 | 0.3 |
| 31 | {4 / 9} | 2.2 | 15(b) | 34 | 0.5 |

*0.33 parts of dibutyltinbutoxychloride incorporated in the composition.

These compositions may be stored in a sealed tube for at least six months without curing or altering their physical properties.

When the above examples are repeated utilizing other silanes having mixed functional groups with hydroxyl-terminated organopoly-siloxanes, elastomeric materials are obtained which have properties substantially equivalent to those specified in the examples.

Although specific examples of the invention have been described herein, other variations and modifications falling

What is claimed is:
1. A composition stable in the absence of moisture having the formula:

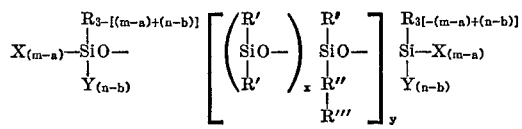

wherein R is selected from the group consisting of monovalent hydrocarbon radicals, halogenated monovalent hydrocarbon radicals and cyanoalkyl radicals; R' is selected from the group consisting of monovalent hydrocarbon radicals, halogenated monovalent hydrocarbon radicals and cyanoalkyl radicals; R" is a divalent hydrocarbon radical; R''' is a polymeric organic group derived from recurring olefinic units and linked to R" by a carbon-to-carbon linkage; said olefinic units are derived from olefinic compounds selected from the group consisting of unsaturated aliphatic hydrocarbons, unsaturated halogenated hydrocarbons, vinyl aromatic compounds, unsaturated acids and esters, unsaturated amides, unsaturated nitriles and mixtures thereof; X and Y are different functional groups, each of which are present on each terminal silicon atom, said functional groups are selected from the class consisting of halogen, acyloxy, aminooxy, amido, amino and oximo radicals; $a$ and $b$ are each numbers equal to or less than 1 and whose sum is equal to 1; $m$ and $n$ are numbers each greater than 0 and less than 3, $m$ is a number greater than $a$ and $n$ is a number greater than $b$ and the sum of $m$ and $n$ is greater than 1; $x$ is a number of from 0 to 20,000 and $y$ is a number of from 1 to 500.

2. The composition of Claim 1 wherein X is an acyloxy radical, Y is an oximo radical and $m$ and $n$ are each equal to 1.

3. The composition of Claim 1 wherein X is an aminooxy radical, Y is an amido radical and $m$ and $n$ are each equal to 1.

4. The composition of Claim 1 wherein X is an amino radical, Y is an oximo radical and $m$ and $n$ are each equal to 1.

5. The composition of Claim 1 wherein X is an acyloxy radical and Y is an aminooxy radical.

6. The composition of Claim 1 wherein X is an aminooxy radical and Y is an oximo radical.

7. A method for preparing the composition of Claim 1 which comprises reacting in the absence of moisture a silane of the formula:

$$R_{4-m-n}SiX_mY_n$$

with an organopolysiloxane having the formula:

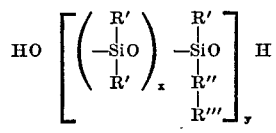

wherein R is selected from the group consisting of monovalent hydrocarbon radicals, halogenated monovalent hydrocarbon radicals and cyanoalkyl radicals; R' is selected from the group consisting of monovalent hydrocarbon radicals, halogenated monovalent hydrocarbon radicals and cyanoalkyl radicals; R'' is a divalent hydrocarbon radical; R''' is a polymeric organic group derived from recurring olefinic units and linked to R'' by a carbon-to-carbon linkage; said olefinic units are derived from olefinic compounds selected from the group consisting of unsaturated aliphatic hydrocarbons, unsaturated halogenated hydrocarbons, vinyl aromatic compounds, unsaturated acids and esters, unsaturated amides, unsaturated nitriles and mixtures thereof; X and Y are different functional groups selected from the class consisting of halogen, acyloxy, aminooxy, amido, amino and oximo radicals; $m$ and $n$ are numbers each greater than 0 and less than 3 and the sum of $m$ and $n$ is greater than 1; $x$ is a number of from 0 to 20,000 and $y$ is a number of from 1 to 500 at a temperature up to 200° C. to form an organopolysiloxane composition having different functional groups on each terminal silicon atom.

8. The method of Claim 7 wherein the silane is reacted with the organopolysiloxane at a temperature of from about 50° C. to 150° C.

9. The method of Claim 7 wherein at least 2 moles of silane are present per mole of organopolysiloxane.

References Cited
UNITED STATES PATENTS

| | | | |
|---|---|---|---|
| 3,560,244 | 2/1971 | Neuruth | 117—71 |
| 3,555,109 | 1/1971 | Getson | 260—827 |
| 3,441,537 | 4/1969 | Lengnick | 260—46.5 G |
| 3,531,424 | 9/1970 | Swanson | 260—46.5 G |

MELVYN I. MARQUIS, Primary Examiner

U.S. Cl. X.R.

117—123 D, 135.1; 260—18 S, 37 SB, 46.5 G, 46.5 E